UNITED STATES PATENT OFFICE.

ARNOLD ERLENBACH, OF DESSAU, GERMANY, ASSIGNOR TO ACTIEN GESELLSCHAFT FÜR ANILIN FABRIKATION, OF BERLIN, GERMANY.

PROCESS OF DESTROYING INSECTS.

1,097,406.  Specification of Letters Patent.  Patented May 19, 1914.

No Drawing.  Application filed October 23, 1912.  Serial No. 727,434.

*To all whom it may concern:*

Be it known that I, ARNOLD ERLENBACH, a subject of the King of Bavaria, residing at Dessau, Germany, my post-office address being Schillerstrasse 5, Dessau, Germany, have invented new and useful Improvements in Processes of Destroying Insects, of which the following is a specification.

Naphthalene and camphor have generally been used for protecting furs from damage by moths. These substances act as insectifuges owing to their unpleasant odor, but they are not insecticides and are uncertain in their action. Moreover, the smell of these substances as mentioned before is by no means pleasant, an objection shared by other materials which have been used for killing the beetles and other insects that attack zoological and other collections.

Now my present invention relates to a new means for protecting furs and skins from the attack of moths and the like it having been found that para-dichlorobenzene which has not an unpleasant odor is an excellent agent for this purpose; its action is due to the fact that, unlike naphthalene and camphor, it is a direct poison for these insects, so that after a comparatively short time moths and larvæ thereof are completely killed. Para-dichlorobenzene is also fatal to the insects which cause great damage to museums. For example, this substance kills with certainty not only decay mites but also museum beetles (*Anthrenus museorum*) and their larvæ; in the like manner lard beetles and their larvæ are killed by vapor of para-dichlorobenzene. A further important application of this insecticide is as a substitute for the poisons, such as potassium cyanid, hitherto used for killing beetles, butterflies and the like caught by collectors. The use of para-dichlorobenzene for several purposes aforesaid represents, therefore, an essential advance over the prior art.

The following examples illustrate the use of the new insecticide:—

1. Para-dichlorobenzene in the form of crystals, powders or tablets is introduced into a well-closed store-room; the vapors which fill the room within a short time kill rapidly all insects therein and the same fate overtakes any that may enter the room.

2. To kill collectors' insects a suitable quantity of para-dichlorobenzene in any suitable form is introduced into the well-closed receptacle; even large beetles may be killed just as by potassium cyanid, although the action may be somewhat slower.

3. For preserving stuffed animals, butterflies, beetles or the like, para-dichlorobenzene, is introduced into the glass case in any desired quantity in any form; thus it may be introduced as vapor, in solution or admixed with other substances.

4. In some cases it is advisable to use the para-dichlorobenzene in solution; for instance 10 parts may be dissolved in 100 parts in alcohol. The solution may be distributed by spraying it into the chamber to be filled with the vapor; or the solution may be spread over the objects to be protected from the attack of insects, for instance furs or clothes.

The para-dichlorobenzene may of course also be used as absorbed by some convenient material, such as paper or textile fabric or the like. Likewise it may be employed in admixture with other suitable material, such as easily or not easily volatile materials and more especially in admixture with naphthalene or camphor. Thus for instance 100 parts of naphthalene in a finely divided state and 100 parts of para-dichlorobenzene also in a finely divided state are thoroughly mixed together; the preparation thus obtained represents a special form of my new insectifuge or insecticide.

Now what I claim is,—

1. Process of destroying obnoxious insects by exposing them to the vapors of para-dichlorobenzene.

2. Process of protecting furs, skins and the like from the attack of obnoxious insects by exposing them to the vapors of para-dichlorobenzene.

3. Process of destroying insects causing great damage to museums, by introducing para-dichlorobenzene into the receptacle containing the objects to be protected and the insects to be killed.

4. Process of destroying insects causing great damage to museums, by introducing para-dichlorobenzene in the solid state into the receptacle containing the objects to be protected and the insects to be killed.

In testimony whereof I have signed my name to this specification in the presence of two subscribing witnesses.

ARNOLD ERLENBACH.

Witnesses:
WOLDEMAR HAUPT,
HENRY HASPER.